Patented July 24, 1934

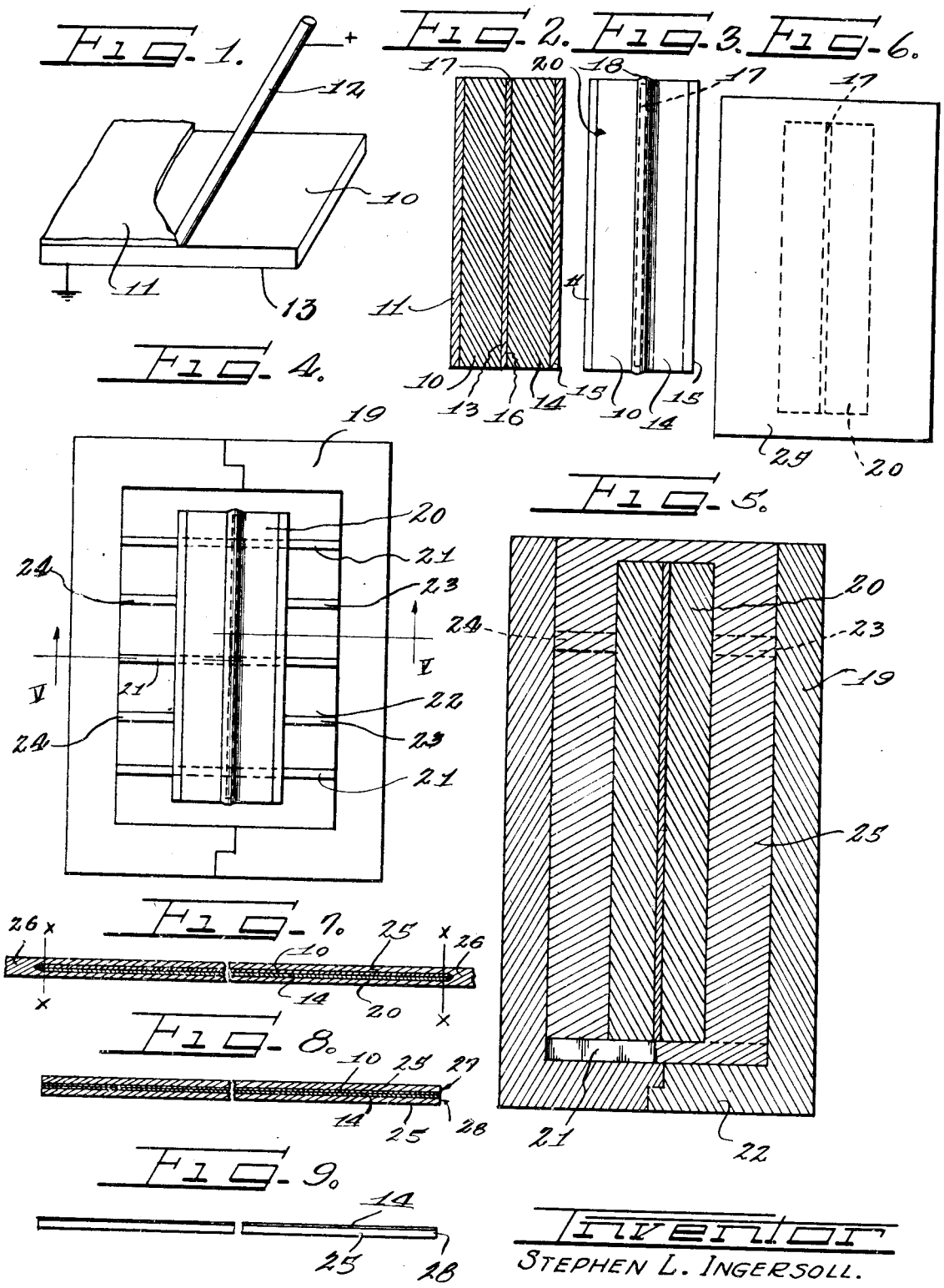

1,967,754

UNITED STATES PATENT OFFICE 1,967,754

METHOD OF PREPARING LAMINATED METAL

Stephen L. Ingersoll, Chicago, Ill., assignor to Ingersoll Steel and Disc Co., Chicago, Ill., a corporation of Illinois Application January 23, 1933, Serial No. 653,049

7 Claims. (Cl. 22—203)

This invention relates to an improved method for the preparation of composite metal articles having constituent plies of different metals integrally welded together.

More specifically, this invention relates to improvements in a method of making composite articles having a surface composed of a stable surface alloy or metal such as stainless steel, rustless iron and the like, and a backing or body portion of a less expensive ferrous metal of different characteristics.

In my United States Patent No. 1,868,749, dated July 26, 1932, I have described and claimed a method of making laminated metal articles. The present invention is a modification of my patented process involving an additional step or steps in the process to overcome certain difficulties which may arise during commercial operation.

In my patented process, two metal slabs of the desired corrosion-resistant properties having pickled, polished, or otherwise suitably prepared surfaces are placed together so that the prepared surfaces are in juxtaposed relation but separated by a medium which prevents substantial welding of the prepared surfaces in the subsequent process steps. The adjacent edges surrounding the common prepared surfaces of the composite slabs may then be sealed, for example by welding, and the composite slabs placed into a mold and a metal of different characteristics poured completely around the composite slabs.

According to my patented process, after the removal from the mold, the ingot is subjected to hot rolling operations which complete the weld between the cast metal and the metal slabs but, due to the presence of the separating medium, do not weld the prepared surfaces together. The rolled material is next separated along the prepared surfaces to form two composite sheets, each of which presents a surface of the desired character backed by a less expensive metal.

In addition to the separating compositions described in my Patent No. 1,868,749, I have described and claimed other compositions in my copending application Serial No. 627,989, filed August 8, 1932, which may, of course, be used in the process to be hereinafter described. The separating compounds disclosed in my above-referred to application are chromium-oxygen compounds such as chromium trioxide ($CrO_3$), chromic oxide ($Cr_2O_3$), and the like.

I have now invented modifications of the process described in my Patent No. 1,868,749 which insure a thorough welding of the plies even although metals having widely different characteristics are used. In my prior process, an integral welding or combination between the cast metal and the juxtaposed slabs has been sometimes difficult to obtain even by subsequent rolling operations at forging temperatures.

The process of this invention, however, insures integral welds between the cast metal and the surface metal either by heating the slabs prior to pouring metal around them, or by first welding a relatively thin layer of a metal having approximately the same melting point and/or composition as the metal to be poured in casting or by a combination of the two steps. Thus, in the casting operation, the welded layer is readily fused with the molten casting metal to form an integral weld between the slabs and the casting.

It is therefore an object of this invention to provide a process for making composite metal articles composed of a plurality of plies integrally welded together without the necessity of relying upon rolling operations at forging temperatures to complete the weld.

It is another object of this invention to provide an improved process for making composite metal articles whereby metals of widely different characteristics may be integrally welded together without destroying the characteristics of the constituent metals.

Another important object of this invention is to provide a modification of the process described and claimed in my United States Patent No. 1,868,749 whereby laminated sheets having constituent plies of different metals may be readily welded together to form an integral sheet.

Other and further important objects of this invention will be apparent from the following description and appended claims.

This invention (in a preferred form) is illustrated in the accompanying drawing and hereinafter more fully described.

On the drawing:

Figure 1 is a perspective view of a slab of metal used for the surface material, illustrating the operation of welding thereon, by means of a welding rod, a layer of metal having a melting point near that of the metal to be subsequently cast around the slab.

Figure 2 is a cross-sectional view showing two metal slabs in juxtaposed relation separated by a non-binding composition and having a relatively thin layer of metal welded to their outer surfaces.

Figure 3 is a top plan view of the slabs shown in Fig. 2 illustrating the manner in which they Figure 4 is a top plan view of a mold open at the top and showing the welded slabs illustrated in Fig. 3 inserted into the mold.

Figure 5 is a cross-sectional view taken substantially along the lines V—V of Fig. 4.

Figure 6 is a top plan view of an ingot stripped from the mold, showing in dotted lines the slabs in the center of the casting.

Figure 7 is a broken transverse sectional view of a sheet rolled from the ingot of Fig. 6.

Figure 8 shows the rolled sheet of Fig. 7 with the ends removed.

Figure 9 illustrates a single finished sheet of the composite article.

As shown on the drawing:

For purposes of convenience, the stable surface alloy will be referred to as stainless steel while the metal which is to be united to the surface alloy will be referred to as mild steel. It is to be understood, however, that any suitable type of ferrous alloy or metal may be used without departing from the scope of this invention, since the invention, in its broader aspects, includes the formation of composite metal articles containing metal plies of different characteristics which are integrally welded together to form a composite unit.

In Fig. 1, a slab of stainless steel 10 is shown as having welded thereon a relatively thin layer 11 of mild steel from a low carbon steel welding rod 12. An electric welding operation is illustrated, but it is to be understood that other types of welding operations may be used to puddle the mild steel layer 11 onto the stainless steel slab 10.

The stainless steel slab 10 has a surface 13 treated as, for example, by pickling and/or polishing operations. Such prepared surface 13 is coated with any suitable separating compound, such as a chromium-oxygen compound, as described in my application Serial No. 627,989 referred to above, or any of the compositions referred to in my Patent No. 1,868,749. The stainless steel slab 10 having the mild steel layer 11 welded thereon is next placed in juxtaposed relation with an identically prepared slab 14 having a mild steel layer 15 thereon and a prepared surface 16. A separating compound 17 as shown in Fig. 2, separates the surface 13 from the surface 16.

As shown in Fig. 3, the stainless steel slabs 10 and 14 are welded around all of the adjacent edges, as at 18, to form a sealed chamber for the separating composition therein and to protect the prepared surfaces 13 and 16 in the subsequent operations.

If desired, the slabs 10 and 14 may first be welded together to seal the separating compound therebetween and the mild steel layers 11 and 15 then welded on the exposed surfaces. The sides and/or ends also may have mild steel layers welded thereto but this is not essential.

For purposes of convenience, the slabs 10 and 14, after being welded together as shown in Fig. 3, will be hereinafter referred to as an insert 20.

After removing scale from all welded surfaces by scraping, brushing or pickling treatments, the insert 20, as shown in Fig. 4, is placed in a sectional metal mold 19. A sand mold may be used if desired. The mold 19 is of sufficient size so that metal may be poured therein to entirely surround the insert 20. The mold is provided with a number of supports or bridges 21 which lie across the bottom 22 of the mold to support the insert 20 in spaced relation from the bottom 22. The bridges 21 are preferably made of metal of the same composition as that which is to be poured into the mold so that they will melt and form part of the ingot.

As shown in Figs. 4 and 5, additional props or supports 23 and 24 similar in composition to the bridges 21 may be placed near the top of the mold to hold the insert 20 in place during the pouring operation. Since the bridges and props 21, 23 and 24 are preferably of the same mild steel composition as the material 25 which is subsequently poured into the mold 19, these elements melt down into the poured metal 25 together with the welded surfaces 11 and 15 and welded edges 18 of the insert 20.

As shown in Fig. 6 after the ingot is stripped from the mold 19, an integral unit of the insert 20 and the cast mild steel 25 is produced. The separating material 17, however, maintains the prepared surfaces of the stainless steel slabs 10 and 14 separated from each other.

The ingot shown in Fig. 6 may be rolled either hot or cold to produce the desired article such as, for example, the sheet shown in Fig. 7. The rolling operation may aid the welding of the insert 20 to the cast metal 25 when carried out at elevated temperatures. However, the fusing of the welded mild steel layers 11 and 15 with the cast metal 25 produces a completely satisfactory weld without the necessity of relying upon subsequent hot rolling treatments to complete the weld.

In the duplex sheet shown in Fig. 7, the stainless steel slabs 10 and 14, which have now been rolled to relatively thin layers, are held together at the marginal edges 26 thereof. The marginal edges 26 are formed because the insert 20 in the mold, as shown in Fig. 5, is spaced from the top, bottom and side of the mold, so that the mild steel 25 flows all around the insert.

The marginal edges 26 are next clipped off along the lines X—X shown in Fig. 7. This produces two juxtaposed sheets 27 and 28, each having a backing of mild steel 25 and a stainless steel surface 10 or 14 adjacent each other as shown in Fig. 8. After the marginal edges 26 are clipped off, the laminated sheets 27 and 28 are readily separated because the separating material between the slabs has prevented the prepared surfaces from becoming welded together during any of the rolling or heat-treating operations. In fact, in many cases, the rolling strains cause the sheets 27 and 28 to pop apart as soon as the marginal edges 26 have been clipped therefrom.

Fig. 9 illustrates the finished composite sheet 28 having a stainless steel surface 14 and a mild steel backing or base 25.

The welding or puddling of the relatively thin layer of mild steel onto the stainless steel slab before the casting operation effects a sufficient melting or puddling of the stainless steel to cause a complete fusion of the mild steel therewith. Heat is supplied only at the point where the layer of mild steel is being built up so that the melting of the stainless steel slab is local to this point. Thus, while exceedingly high temperatures are employed in the welding operation, the high temperatures are largely localized so that there is no general melting down of the entire slab of stainless steel. This prevents any substantial migration of carbon from the mild steel into the stainless steel and preserves the corrosion resistant properties of the stainless steel.

As an alternative step to that of puddling a mild steel onto the surface of the stainless steel slab, or in addition thereto, the stainless steel slabs may be heated prior to insertion into the mold to effect a more complete weld with the poured metal than if the slabs were cool or not heated. As illustrative of the temperatures to be employed, a ½" thick slab might be heated to 1000° F. and a ¾" thick slab to 1200° F. In general, the thicker the slab, the higher will be the temperature to which it should be preheated. It is usually unnecessary to heat higher than 1500° F.

By preheating the stainless steel slabs, the cooling of the poured metal as it strikes the slab surfaces is largely prevented and effective puddling of the poured metal onto the surfaces of the slabs takes place, with the result that a complete weld is effected. The poured metal is, of course, initially at a temperature above its own melting point and consequently above the melting point of the stainless steel. There is, therefore, an actual melting of the stainless steel by contact with the hot poured metal and this effects a perfect bond between the metal of the slab and the poured metal.

I am aware that many details of the invention may be varied through a wide range without departing from the spirit of this invention, and I, therefore, do not desire limiting the patent granted hereon otherwise than is necessitated by the prior art.

I claim as my invention:

1. In the process of forming composite ingots of dissimilar metals by the casting of one metal about an insert of the other metal, the steps which comprise building up on the surface of said insert a layer of metal having characteristics similar to the metal to be poured by fusing and welding the metal forming said layer in successive increments against said insert metal and pouring a molten metal against said built-up layer.

2. In the process of forming composite ingots of dissimilar metals by the casting of one metal about an insert of the other metal, the steps which comprise building up on the surface of said insert a layer of metal having characteristics similar to the metal to be poured by bonding the metal forming said layer in successive increments against said insert metal and pouring a molten metal against said built-up layer of metal on the insert.

3. In the process of forming composite ingots of dissimilar metals, the steps which comprise building up on the surface of a slab of metal a layer of metal by electrically fusing and welding the metal forming said layer in successive increments against said slab, and pouring a metal having characteristics similar to the metal of the built-up layer against said layer.

4. In the process of forming composite ingots of dissimilar metals by the casting of one metal about an insert of the other metal, the improvements which comprise building up on the surface of said insert a layer of metal having characteristics similar to the metal to be poured by electrically fusing and welding the metal forming said layer in successive increments against said insert metal and pouring molten metal about said insert.

5. In the process of forming composite ingots of dissimilar metals by the casting of one metal about an insert of the other metal, the improvements which comprise building up on the surface of said insert a layer of metal having characteristics similar to the metal to be poured by placing the metal to form said layer in an electric circuit and depositing and bonding said metal in successive increments against said insert metal and pouring molten metal against said insert.

6. The process of forming composite ingots of dissimilar metals by casting one metal against an insert of the other metal which comprises gradually covering the entire surface of said insert with a layer of metal having characteristics similar to the metal to be poured by fusing and welding the metal forming said layer in successive increments against said insert metal and pouring a molten metal about said insert.

7. In the process of forming composite metal articles composed of an insert metal backed with a cast metal of different characteristics, the steps which comprise gradually covering the entire surface of said insert metal with a layer of metal having characteristics similar to the metal to be cast therearound by electrically depositing and bonding said metal in successive increments against said insert and pouring molten metal against said so formed insert.

STEPHEN L. INGERSOLL.